G. M. L. McMILLEN
GRAIN-DRILLS.

No. 179,420. Patented July 4, 1876.

Witnesses;
Chas. M. Peck
Wm. Ritchie

Inventor;
Gilbert M. L. McMillen
by his Atty's.
Peck & Co.

UNITED STATES PATENT OFFICE.

GILBERT M. L. McMILLEN, OF DAYTON, OHIO.

IMPROVEMENT IN GRAIN-DRILLS.

Specification forming part of Letters Patent No. 179,420, dated July 4, 1876; application filed February 23, 1876.

*To all whom it may concern:*

Be it known that I, GILBERT M. L. MCMILLEN, of Dayton, in the county of Montgomery and State of Ohio, have invented certain new and useful Improvements in Force-Feed Attachments for Grain-Drills; and I do hereby declare the following to be a full, clear, and exact description of the same.

This invention relates to that class of grain-drills which have upon the bottom of their seed-boxes a series of chambers or receiving-cups, arranged at equal intervals, in which revolve upon a common shaft a corresponding number of agitating or feed wheels, for forcing the grain into the spouts, whence it passes through the hoes into the furrows made to receive it.

My improvement consists in the arrangement and application of a feed-wheel that is made adjustable, and used in connection with a disk held in suitable bearings, all as will be described, and the invention distinctly pointed out in the claim.

To enable others skilled in the art to which my invention appertains to make and use the same, I would thus proceed to describe its construction and mode of operation, referring throughout to the accompanying drawings, in which—

Figure 1:
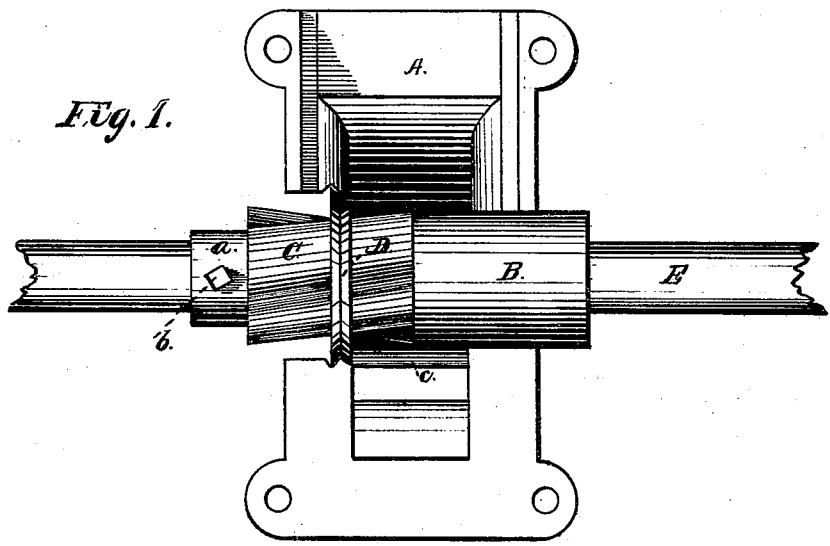
Figure 2:
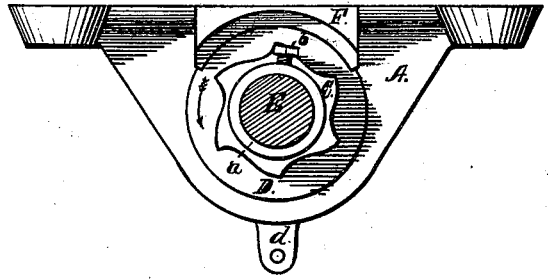

Figure 1 is a plan view of my invention. Fig. 2 is a side elevation of the same.

Corresponding letters of reference indicate like parts in all the figures.

A represents the seed-cup, which is of the ordinary shape, and secured to the bottom of the seed-box in the usual manner, with an opening of communication between the two, controlled by slides arranged in any convenient way. In this chamber is journaled my improved feeding device, consisting of a smooth cylinder, B, of about the same width as the chamber A, and a diagonally-fluted feed-wheel, C, extending from the cylinder, and of about the same length. The cylinder fits snugly in a bearing in one side of the chamber, and the fluted wheel, which may be of various shapes, rests in a disk, D, the orifice of which fits snugly upon the wheel, and conforms to its shape, as in Fig. 2.

The periphery of the disk is a V-shaped groove, that fits upon a correspondingly-shaped bearing in the side of the chamber. E represents the shaft, passing through the wheel and cylinder, and receiving its motion of revolution from the traction of the drill by gearing so arranged that the shaft may be moved to and fro in the line of its length by means of a simple lever used in connection with an index-plate arranged upon the seed-box in any convenient way.

A sleeve, *a*, upon the end of the fluted wheel encompasses the shaft, and is provided with a set-screw, *b*, by which the feeding mechanism is clamped and made adjustable upon the shaft.

To complete the device, a saddle-piece, F, Fig. 2, with its top flush with the top line of the chamber A, fits over the cylinder and disk, with which it conforms, aiding to form bearings for both. When grain is admitted into the chamber A from the seed-box, the revolution of the cylinder and fluted wheel, carrying with it the disk in the direction indicated by the arrow, agitates the grain, and feeds it in a regular ascertained quantity through the opening shown at *c*, Fig. 1, and into the receiving-cup, which is hung to the ears *d*, in the usual manner.

It will be noticed that the cylinder B has a perfectly smooth surface, and that it rests snugly upon the bottom of the chamber, so that no grain can pass under or be injured by its revolution, should it fall behind it.

The feeding is entirely accomplished by the fluted wheel C. To change the quantity to be drilled, it is only necessary to slide the shaft E by means of the before-mentioned lever, thus moving the fluted wheel in or out, as the case might be, and thereby lessening or increasing the feeding capacity of the chamber A by what, in effect, would be shortening or lengthening the fluted wheel.

When it is desired to have certain chambers upon the drill feed one quantity and the others a different quantity, it can be effected by loosening the set-screws *b*, and adjusting the wheels and the cylinders at ascertained points upon the shaft, and there clamping them.

I am aware that the herein-described feed-wheel is old, and has been used in a chamber in connection with a sliding partition-plate, and therefore disclaim it and all of the devices separately; but by having the feed-wheel adjustable upon the shaft with which it revolves, and having that shaft arranged to slide longitudinally to adjust all of the feed-wheels simultaneously, I achieve both novelty and simplicity.

Having thus fully described my invention, I claim as new, and desire to secure by Letters Patent, as follows:

The herein-described attachment for grain-drills, consisting substantially of the chamber A, cylinder B, feed-wheel C, disk D, saddle-piece F, sleeve $a$, by which the feed-wheel is adjustable upon the shifting shaft E, for allowing irregular quantities to be drilled from certain hoes, substantially in the manner and for the purpose specified.

Witness my hand this 18th day of February, A. D. 1876.

GILBERT M. L. McMILLEN.

Witnesses:
CHAS. M. PECK,
WM. RITCHIE.